United States Patent [19]

Hirao et al.

[11] Patent Number: 4,849,813
[45] Date of Patent: Jul. 18, 1989

[54] VIDEO CAMERA WITH HIGH-SPEED SCANNING

[75] Inventors: Yoshiaki Hirao, Habikino; Ryuichiro Kuga, Katano; Teruyoshi Miura, Hirakata; Yoshitomi Nagaoka, Neyagawa, all of Japan

[73] Assignee: Matsushita Electric Industrial Co., Ltd., Osaka, Japan

[21] Appl. No.: 191,886

[22] Filed: May 9, 1988

[30] Foreign Application Priority Data

May 7, 1987 [JP] Japan ................................ 62-111048

[51] Int. Cl.$^4$ .............................................. H04N 9/04
[52] U.S. Cl. ...................................... 358/137; 358/141
[58] Field of Search ...................... 358/41, 12, 11, 137, 358/140, 141, 228

[56] References Cited

U.S. PATENT DOCUMENTS 4,458,271 7/1984 Horstmann ............................ 358/12
4,677,464 6/1987 Yamaji et al. ......................... 358/41

Primary Examiner—Jin F. Ng
Assistant Examiner—Stephen Brinich
Attorney, Agent, or Firm—Wenderoth, Lind & Ponack

[57] ABSTRACT

According to the present invention, a narrow latitude caused by a narrow dynamic range of a solid state image pickup device is improved, and a video camera capable of obtaining a high quality video signal having no signal saturation and black collapse is realized. Scanning is executed in a plurality of times during normal one picture scanning period (one field or one frame period) prescribed in the broadcasting system, and the stop value of a stop mechanism of a camera lens is prescribed so that the levels of video signals corresponding to respective pictures become a fixed value, thus obtaining respective output signals with no saturation. These output signals are stored in a memory in each picture unit after A/D conversion. Then, a certain arithmetic processing is performed in synchronization with respective picture positions, and these video signals are outputted in synchronization with the vertical synchronizing timing prescribed in the broadcasting system as digital video signals having predetermined levels. These output digital video signals are restored again to the synchronizing frequency prescribed in the orginal broadcasting system thereafter. The digital video signals thus obtained have S/N improved to be better than the video signal which is outputted from the image pickup device. Accordingly, the dynamic range is also improved sufficiently.

19 Claims, 5 Drawing Sheets (a)

(b)

(c) SATURATION $E^*$ (d) BLACK COLLAPSE $E^*$ (a)

(b)

(c)

(d)

(e)

(f)

VIDEO CAMERA WITH HIGH-SPEED SCANNING

BACKGROUND OF THE INVENTION

1. Field of the Invention

The present invention relates to a video camera (or a television camera) for converting a picked-up optical image into video (or television) signals.

2. Description of the Prior Art

Conventionally, commercial video cameras have been mostly of so called single plate type in which a color picture image is obtained using a sheet of solid state image pickup device. FIG. 2 shows a basic circuit structure of a single plate camera. An image of an object 1 is focused on an image pickup device 21 through a camera lens 2. The image pickup element 21 is driven by an image pickup device drive part 22 to perform photoelectric conversion of the image into electric charges and output an electric signal after accumulating the charges for a given period of time. This output signal is amplified by a preamplifier 23, and subjected to necessary processing such as gamma correction, separation and synthesis of luminance signal and chrominance signal and addition of synchronizing signal in a process circuit 24 to become a video signal $E_{VIDEO}$ suitable for a broadcasting system. A control circuit part 25 applies a timing pulse Pt for controlling storage and read-out (output) timings of the image pickup device 21 to the drive part 22, and a synchronizing signal $P_{SYNC}$ to the process circuit 24. In case of the NTSC system, the vertical synchronizing frequency (field frequency) is 60 Hz, and the horizontal synchronizing frequency is approximately 15.75 KHz.

The picture quality of such commercial video camera as above is not satisfactory. In particular, the SN ratio (signal/noise ratio) of the image pickup device is determined by the structure and the noise characteristic of the image pickup device, and is difficult to the improved sufficiently. Also, the dynamic range of the image pickup device determined by the saturated luminous energy level and the noise level has a great influence upon the latitutde of the video camera. The latitude of a video camera in which a solid state image pickup element is employed is as low as approximately ±1 EV (Exposure Value). Hence, for an object having a big contrast difference, the video signal is partly saturated, or black collapsing, lack of chrominance signal and so forth are produced, thereby damaging the picture quality badly.

Such circumstances will be described referring to FIG. 3. An object A of high contrast has a high luminance portion B (the luminance has a gradient in vertical direction) in a horizontal stripe form at the central portion as shown in FIG. 3 (a), and low luminance portions C, D above and below the portion B. It is assumed that only a luminance signal is considered as a video signal for convenience sake, and also that only one field period prescribed in the broadcasting system is considered. In FIG. 3 (b), a profile of the luminance level at the time of vertical scanning of the object A is shown. The axis of abscissa shows the time corresponding to vertical scanning (tv: effective period of vertical scanning) of the video camera, the axis of ordinate shows the luminance amplitude of the object, and Smax, Smin and Sav show the maximum value, the minimum value and the average value of the luminance amplitude, respectively.

It is now considered that the stop value of the camera lens is determined based on an average luminance level (Sav in FIG. 3 (b)) in one field. When the contrast of the object A to be picked up is big, and a part of the luminance level of the high luminance portion B exceeds the latitude of the image pickup device of the video camera, the image pickup device outputs a partly saturated luminance signal as shown in FIG. 3 (c) (E: saturation level of the image pickup element).

Further, in case the stop value of the camera lens is determined based on the maximum value (Smax in FIG. 3 (b)) of the luminance level in one field, no signal saturation is produced as shown in FIG. 3 (d), but the levels of the low luminance portions C, D that occupy a large part of the picture become very low under the influence of the high luminance portion B and the grading of the low luminance portion is not reproduced (black collapse).

The saturation and black collapse of the video signal described above deteriorate the picture quality extremely, but they happen frequently due to the narrow dynamic range of the image pickup device. This is a big problem in obtaining a high picture quality of the video camera. However, it is very difficult to sufficiently improve the dynamic range of the image pickup device under existing circumstances.

There has been no trial up to now to improve the dynamic range of a video camera from the aspect of drive method and signal processing method for an image pickup device.

In U.S. Pat. No. 4,677,464, a video camera having a construction which is partly related to the present invention is disclosed. In this U.S. Patent, a high speed image pickup system is disclosed, which has made the picture blurring produced in photographing a moving body to be ⅓ of the conventional case by means of a combination of a camera which shoots at a speed 3 times as fast as the existing broadcasting system and a video tape recorder which is constructed so as to record at a speed three times as high as a standard speed. The abovementioned picture blurring is generated because the video signal obtained from the image pickup device corresponds to a photograph taken at a shutter speed corresponding to the vertical scanning period of the broadcasting system in each picture unit (in case of the NTSC system, to a photograph taken with a low speed shutter at 1/60 second).

The basic point of the video camera disclosed in U.S. Pat. No. 4,677,464 is to scan the image pickup device at a speed of integer (M) times of normal scanning speed, thereby to obtain video images M times the existing system, and are composed so that the signals which are output from the image pickup device are processed in process circuits installed in the number M times as many as the number in a normal video camera. Thus, it has no relation whatever with the improvement of picture quality of a video camera (in particular, improvement of the dynamic range) which will be described in detail hereafter in the present invention.

SUMMARY OF THE INVENTION

It is an object of the present invention to provide a video camera capable of obtaining a high picture quality video signal by improving a narrow latitude resulted from the dynamic range of a solid state image pickup device, in a video camera using a solid state image pickup device.

In order to achieve this object, a video camera of the present invention comprises: at least one image pickup device for receiving optical signals from an object through a camera lens and converting the optical signals to electric signals; an image pickup element drive part which multiplies a horizontal synchronizing frequency and a vertical synchronizing frequency prescribed in a broadcasting system by a specific integer value N, respectively, and drives the image pickup device at the thus modified synchronizing frequencies so as to have storage and read-out of the optical signals performed; a stop control part for controlling a stop mechanism installed in the camera lens based on video signals obtained by driving of the image pickup device executed at said modified synchronizing frequencies so that the video signal is not saturated; an A/D conversion part for performing analog-digital conversion of the video signals outputted from the image pickup device; an arithmetic processing part which adds the A/D converted digital video signals successively at every picture position in accordance with vertical synchronization timings prescribed in the broadcasting system and then converts the amplitudes of the added digital video signals based on a non-linear relation; and a time base restorer which multiplies the modified horizontal synchronizing frequency and vertical synchronizing frequency of the digital video signals computed in the arithmetic processing part by 1/N, respectively, thereby restoring to the synchronizing frequencies prescribed in the broadcasting system.

As described, according to the present invention, the drive of an image pickup element executed at the synchronizing frequency integer times as high as that prescribed in the broadcasting system (hereinafter referred to as Nf drive) is performed, and picture scanning is performed in a plurality of times in one normal scanning period (one field or one frame period). Also, the stop value (i.e.—the aperture size of the stop) of the camera lens is controlled so that the level of the video signal becomes a fixed value at the time of $N_f$ drive, thus obtaining respective output signals without saturation. After A/D conversion of these output signals, respective signals are stored in a memory. Then, a certain arithmetic processing is performed in synchronization with each picture position, and the signals are outputted in synchronization with the timings of the vertical synchronization prescribed in the broadcasting system as a digital video signal having a predetermined level. Thereafter, the video signal is restored again to the synchronizing frequency determined in the broadcasting system.

The digital video signal thus obtained has an S/N ratio improved much better than the video signal which is outputted from the image pickup device, thus the dynamic range is also improved. Presupposing a digital video camera, the composition is also comparatively simple. As described above, the present invention obtains excellent results for a video camera.

DESCRIPTION OF THE PREFERRED EMBODIMENTS

Figure 1:
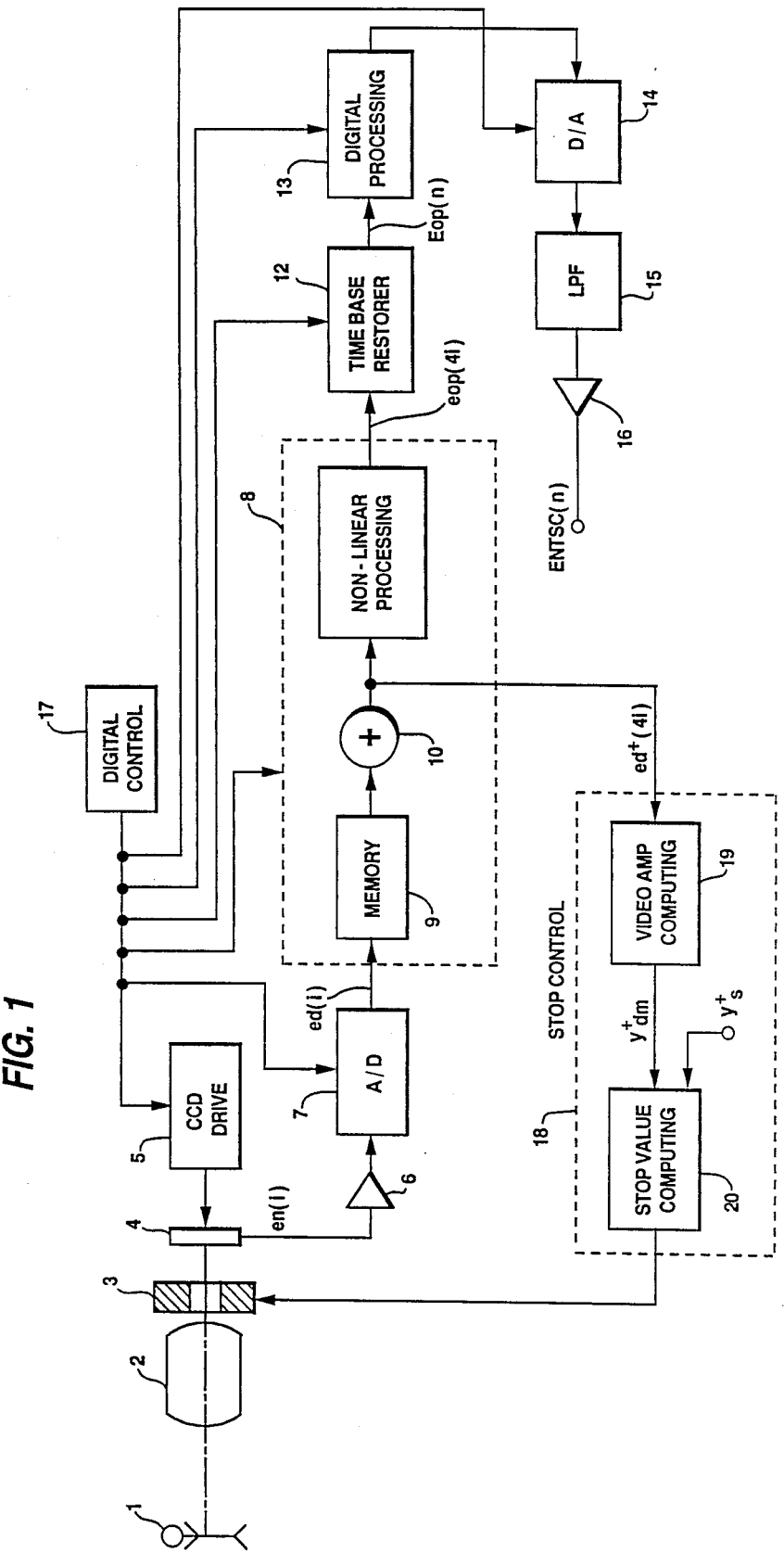
FIG. 1 is a block diagram showing an embodiment in case the present invention is applied to a single plate type video camera.
Figure 2:
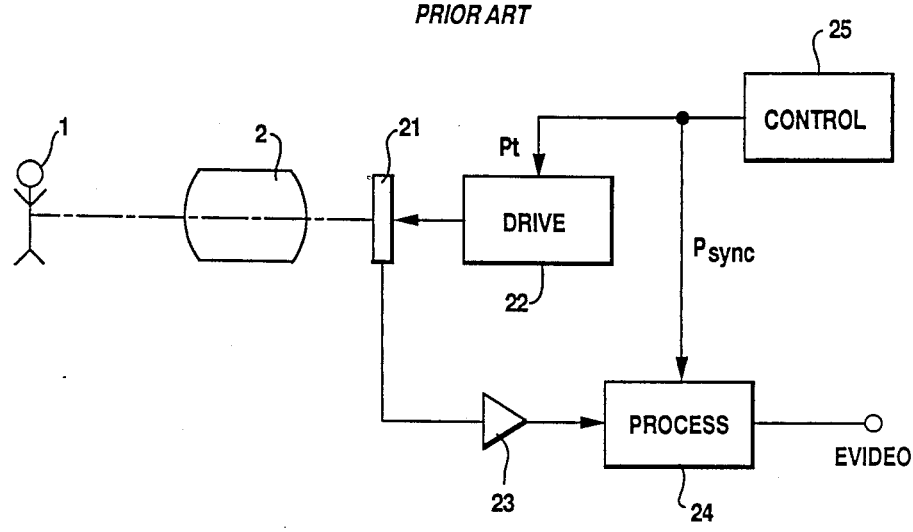
FIG. 2 is a block diagram showing a conventional single plate type video camera.

FIG. 1 is a block diagram showing a basic architecture in case the present invention is applied to a single plate color video camera which outputs a signal based upon the NTSC system An image of an object 1 is focused on a CCD (Charge Coupled Device) 4 through a camera lens 2 and a stop mechanism 3. Each of the camera lens 2 and the stop mechanism 3 are illustrated schematically, but the camera lens 2 is usually formed by combining a plurality of convex lenses and octave lenses, and the stop mechanism 3 is built in the camera lens 2. The CCD 4 is driven by a CCD drive part 5 at a modified synchronizing frequency four times as high as a synchronizing frequency prescribed in the NTSC system (in other words, scanning is performed at a scanning speed four times as high as that in the normal NTSC system, which is referred to as 4f drive). In case of the present embodiment, the horizontal synchronizing frequency after modification is 15.75×4 KHz, and the vertical synchronizing frequency (field frequency) after modification is 60×4 Hz. The CCD 4 outputs photoelectrically converted signals in accordance with the synchronizing frequency after modification. It is now assumed that these photoelectrically converted video signals are expressed as en(i) (i=1, 2, 3, ... ) in field picture unit. These video signals en(i) are converted into digital video signals ed(i) by an A/D converter 7 after amplified by a preamplifier 6.

A digital arithmetic processing part 8 is composed of a memory part 9, an adder 10 and a non-linear processing part 11. The memory part 9 receives the output of the CCD 4 during one field prescribed in the broadcasting system and stores and holds temporarily digital video signals (expressed as ed(4i −3), ed(4i −2), ed(4i −1) and ed(4i), respectively) corresponding to four field worth of pictures in 4f drive which are outputted from the A/D converter 7. The adder 10 digitally adds digital video signals corresponding to each of the four pictures in every field period of normal drive, and outputs as digital added signals ed+(4i).

$$ed^+(4i) = \sum_{k=0}^{3} ed(4i - k) \qquad (1)$$

The non-linear processing part 11 converts the amplitude more than a specific value of the luminance signal among digital added signals ed+(4i) based on a non-linear relational expression, and outputs as operated signals $e_{op}(4i)$ after compressing the maximum amplitude thereof to a predetermined value. In this case, the amplitude of the chrominance signal is unchanged.

A time base restorer 12 in the next stage reduces the horizontal synchronizing frequency and the vertical synchronizing frequency after modification of operated signals $e_{op}(4i)$ to ¼ times, and outputs signals $E_{op}(n)$ (n=4i; i=1, 2, 3...) that have been restored to the synchronizing frequency prescribed in the NTSC system. These restored operated signals $E^*_p(n)$ are subjected digitally to gammer correction, separation and synthesis of luminance signal and chrominance signal, addition of synchronizing signal, and so forth. After digital-analog conversion with a D/A converter 14, the signals are outputted as NTSC signals $E_{NTSC}(n)$ through a low-pass filter (LPF) 15 and an amplifier 16.

A digital control part 17 supplies timing pulses and synchronizing signals prescribing respective operation timings to each of the CCD drive part 5, the A/D converter 7, the digital arithmetic processing part 8, the time base restorer 12, the digital process circuit 13 and the D/A converter 14.

A stop control part 18 is composed of a video amplitude computing element 19 and a stop value computing element 20. The video amplitude computing element 19 computes the maximum value (referred to as ydm+) of a luminance signal amplitude in the digital added signals $ed^+(4i)$ that are outputted from the adder 10. The stop value computing element 20 adjusts the stop value of the stop mechanism 3 for varying the incident luminous energy to the CCD 4 so that the maximum value (ydm+) of the luminance signal amplitude is in accord with a luminance signal amplitude reference value (ys+) provided in advance in the stop value computing element 20. The luminance signal amplitude reference value ys+ is set so that the maximum value of respective luminance signal amplitudes of ed(4i −3), ed(4i −2), ed(4i −1) and ed(4i) becomes almost equal to the signal saturation level of the CCD 4. In case of the present embodiment, the area of the opening part of the stop mechanism 3 is controlled so that it becomes 4 times as large as that at the time of CCD drive of the normal NTSC system.

In the next place, the arrangement for enlarging the dynamic range of a video camera according to the present invention will be described by referring to FIG. 4 and FIG. 5.

The dynamic range of a video camera depends on the dynamic range of the image pickup device employed, and is determined by the noise level and the saturation level against incident luminous energy. Normal service condition of the device has to be set within this dynamic range.

Figure 3:
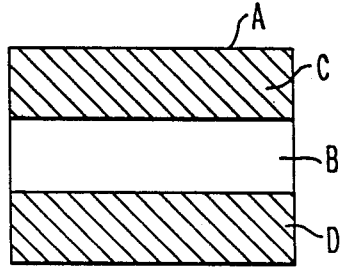
FIG. 3 is an explanatory view for explaining problems of the conventional video camera.
Figure 3:
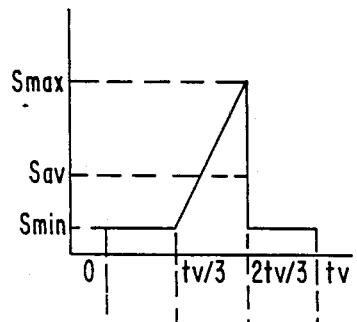
Figure 3:
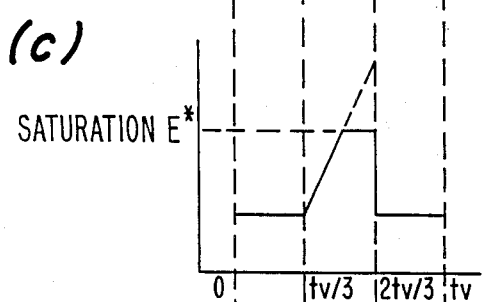
Figure 3:
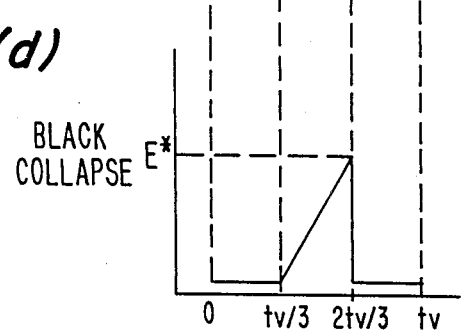

Let's consider such a case that the contrast of an object is high and signal saturation is generated with a conventional video camera. FIG. 4 (a) shows an object A similar to that shown in FIG. 3 (a) that has a high luminance portion B (the luminance has a gradient in vertical direction) in a horizontal stripe form at the central part, and low luminance portions C, D above and below thereof. Here again, only the luminance signal is considered first as the video signal for convenience sake, and only one field period prescribed in the broadcasting system is considered. FIG. 4 (b) shows a profile of the luminance amplitude at the time of vertical scanning in FIG. 4 (a). In the FIG., the axis of abscissas shows the time corresponding to vertical scanning of the video camera (tv: validity of vertical scanning), and the axis of ordinates shows the luminance amplitude of the object (Smax: the maximum value of luminance amplitude).

Figure 4:
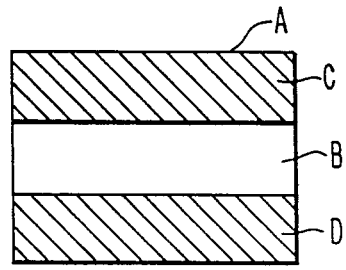
FIG. 4 is a typical view for explaining the operation of each part in an embodiment according to the present invention.
Figure 4:
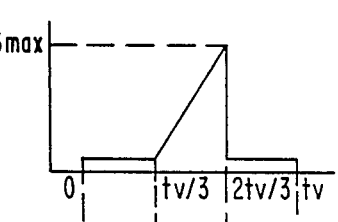
Figure 4:
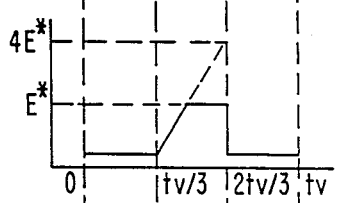
Figure 4:
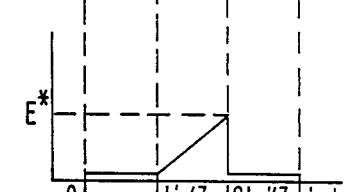
Figure 4:
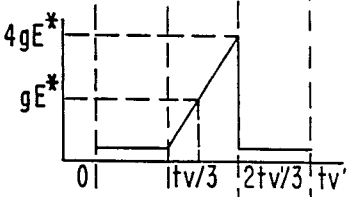
Figure 4:
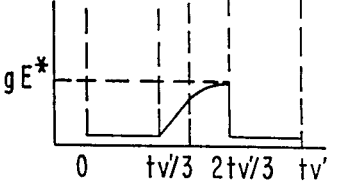
Figure 5:
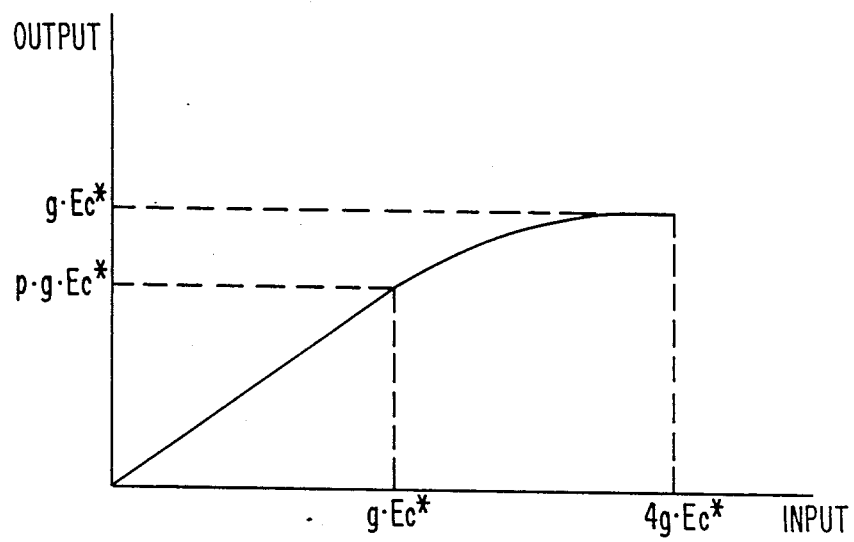
FIG. 5 is an input/output characteristic diagram of a non-linear processing part 11 provided in an embodiment according to the present invention.

FIG. 4 (c) shows a profile of the luminance signal of the object A which is outputted from the image pickup device when the stop adjustment of the camera lens is performed based on the average value of the luminance signal amplitudes and the image is picked up with a conventional video camera having conventional circuit construction. In this case, the signal is saturated by the dynamic range of the image pickup element, and the profile of the high luminance portion is not reproduced (E*: saturation level of the image pickup element). In this case, the original peak value of the luminance signal is taken at 4E* for instance.

The operation in the present embodiment will be described hereafter. As described above, the stop control part 18 adjusts the stop value of the stop mechanism 3 so that the maximum value (ydm+) of the luminance signal amplitudes in digital added signals $ed^*(4i)$ is in accord with the luminance signal amplitude reference value ys+which is set at four times (4E*) of the saturation level of the image pickup device. At this time, the luminance signal amplitudes of video signals en(4i −3), en(4i −2), en(4i −1) and en(4i) corresponding to the object A to be photographed that are outputted form the CCD 4 in one field period provided in the broadcasting system generally show a profile as shown in FIG. 4 (d). In other words, in case of the present embodiment, since the synchronizing frequency is modified to four times with 4f drive, each vertical scanning time is ¼ times of the scanning period of normal scanning. Accordingly, the time corresponding to vertical scanning of the video camera which corresponds to the axis of abscissas in FIG. 4 (d) is ¼ times of normal scanning (tv': validity of vertical scanning when the synchronizing frequency is increased by four times). In this case, the peak of the luminance signal which is outputted from the CCD 4 is controlled by the stop mechanism 3 so as to be equal to the saturation level (E*) of the CCD 4 at the time of normal scanning. No saturation of the signal is generated at this time.

As described, in case of the present embodiment, the signal quantity which may be utilized by 4f drive can be taken out four times as much as that of a video camera of conventional composition. On the other hand, there are dark current and noise component of the element as factors for determining the noise level. But the dark current is in proportion to the storage time of the element, and is almost equivalent to a video camera of conventional composition in case of the present invention. Also, the noise component having no time correlation is added by the adder, thereby to become $4^{\frac{1}{2}}=2$ times. As the result, when the dark current is dominant as the decisive factor of the noise level, the dynamic range of the video camera is improved by about four times. When the noise component is dominant, it is improved by about two times. Accordingly, in case of the present embodiment, no saturation of the signal is generated up to an object having a contrast of 2 to 4 times as compared with a video camera of conventional composition.

When it is assumed that the signal amplification factor of the amplifier 6 is g, and that the signal amplification factor of the A/D converter 7 and the digital arithmetic processing part 8 is unity, the output of the adder 10 will show the peak of the luminance signal at (4·g·E*) as shown in FIG. 4 (e), and no saturation of he signal is generated if the dynamic range of the circuit of the adder 10 is set at more than (4·g·E*). This is feasible by increasing the arithmetic word length (bit number) of the signal handled by the adder 10 (in case of the present embodiment, it is only required to increase by 2 bits), and it is not required to look at again the power supply voltage value and so forth that are required at the time of enlarging the dynamic range of an analog circuit.

The non-linear processing part 11 at the next stage compresses the dynamic range of the luminance signal which is outputted from the adder 10 while keeping also the profile of the high luminance portion of the object A. The non-linear processing part 11 has an input/output characteristic as shown in FIG. 5, and the output signal thereof has a profile of luminance amplitude as shown in FIG. 4 (f). Namely, the non-linear processing part 11 multiplies the input (g·E*) having the magnitude up to the saturation level (E*) of the CCD 4 at the time of normal drive by a certain factor p (p<1), and executes conversion with non-linear relation for the input exceeding the saturation level (E*), thus compressing the level of the input signal to (g·E*). In such a manner, according to the present embodiment, compression of the signal is deviced with non-linearity provided on the high luminance portion over a certain value, and on the other hand, linearity is maintained in the portion having intermediate luminance which occupies the greater part of the object so as not to sacrifice the reproduction of gradation.

Further, since the non-linear processing part 11 is formed so that no non-linear computation is performed for a chrominance signal, deficiency of chrominance signal is not generated by the saturation of the signal in photographing an object of high luminance.

In this manner, according to the present embodiment, the S/N ratio, hence the dynamic range, is improved by 2 to 4 times as compared with a video camera of conventional composition, and photographing of even an object having contrast over 2 to 4times of a conventional one is possible without spoiling reproducibility of both luminance signal and chrominance signal by conducting non-linear processing attaching importance to low luminance and intermediate luminance portions that usually occupy the greater part of an object.

Figure 6:
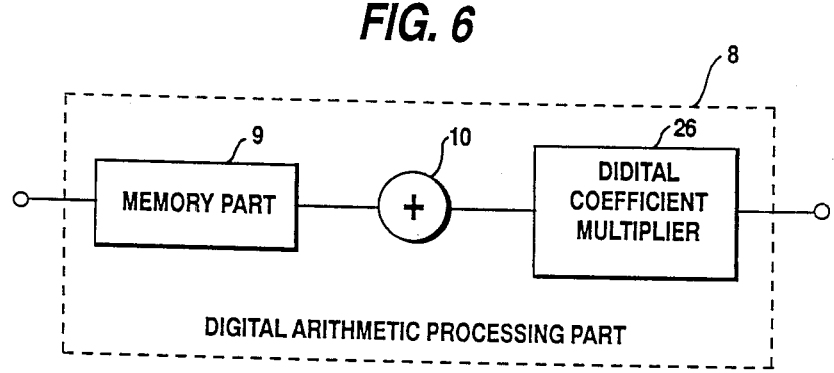
FIG. 6 is a block diagram showing a digital arithmetic processing part which is a component of a second embodiment according to the present invention.

A second embodiment of the present invention includes the digital arithmetic processing part 8 formed as shown in FIG. 6. Since other part of construction may be similar to the abovementioned first embodiment, description will be made by limiting the digital arithmetic processing part. The digital arithmetic processing part 8 is composed of a memory part 9, an adder 10 and a digital coefficient multiplier 26. The memory part 9 receives the output of the CCD 4 which is scanned four times in one field period of normal scanning, and temporarily stores and holds digital video signals (expressed as ed(4i −3), ed(4i −2), ed(4i −1) and ed(4i), respectively) corresponding to four fields worth of pictures which are outputted from the A/D converter 7 in the similar manner as the first embodiment. The adder 10 adds in a digital manner digital video signals corresponding to the four pictures in every field period prescribed in the NTSC system and outputs digital added signals ed+(4i). The digital coefficient multiplier 26 multiplies the output value of the adder 10 by the factor ¼. As the result, the digital arithmetic part 7 outputs a smoothed signal eda expressed as follows:
eda={ed(4i −3)+ed(4i −2) +ed(4i −1)+ed(4i)}/4(2)

In case of this second embodiment, the amplitude level of the smoothed signal eda is the same as a video camera of conventional composition. Also, the dark current of the CCD at the modified synchronizing frequency becomes about ¼ because the storage time for the dark current is ¼ times of that of conventional NTSC system, and the noise component having no time relation is improved to about ½ times by means of the abovementioned smoothing processing. Accordingly, when the dark current is dominant as the decisive factor of the noise level, the dynamic range of the video camera is improved by about 4times, and when the noise component is dominant, the dynamic range is improved by about 2 times.

As a third embodiment of the present invention, it is also possible that the digital arithmetic processing part 8 is composed of a memory part and an adder only. The composition of the memory part and the adder and the composition of the video camera other than the digital processing part may be the same as the abovementioned first and second embodiments, hence the description is omitted. In this embodiment, the dynamic range of the output of the digital arithmetic processing part 8 is 4times as wide as the video camera of conventional composition, and the dynamic ranges of respective parts after the digital arithmetic processing part 8 are set by 4times as wide as those in the first and second embodiments, respectively.

Figure 7:
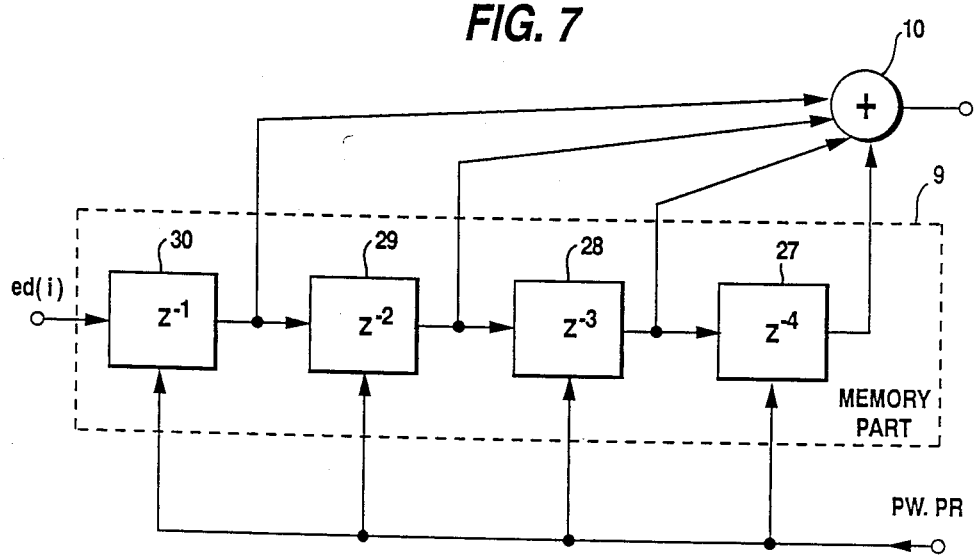
FIG. 7 and FIG. 8 are a block diagram showing an embodiment of a memory portion which is a component of a digital arithmetic processing part employed in the present invention and a timing diagram for explaining the operation thereof, respectively.

A composition example of a memory part provided in the abovementioned respective embodiments will be described hereafter referring to FIG. 7. The memory part 9 is composed of four pieces of field memories 27 thru 30 that store and hold digital video signals ed(4i −3), ed(4i −2), ed(4i −1) and ed(4i) corresponding to field pictures after modification. Write and read-out to and from each field memory are executed simultaneously with timing pulses $P_w$, $P_x$ given from a digital control part 17.

Figure 8:
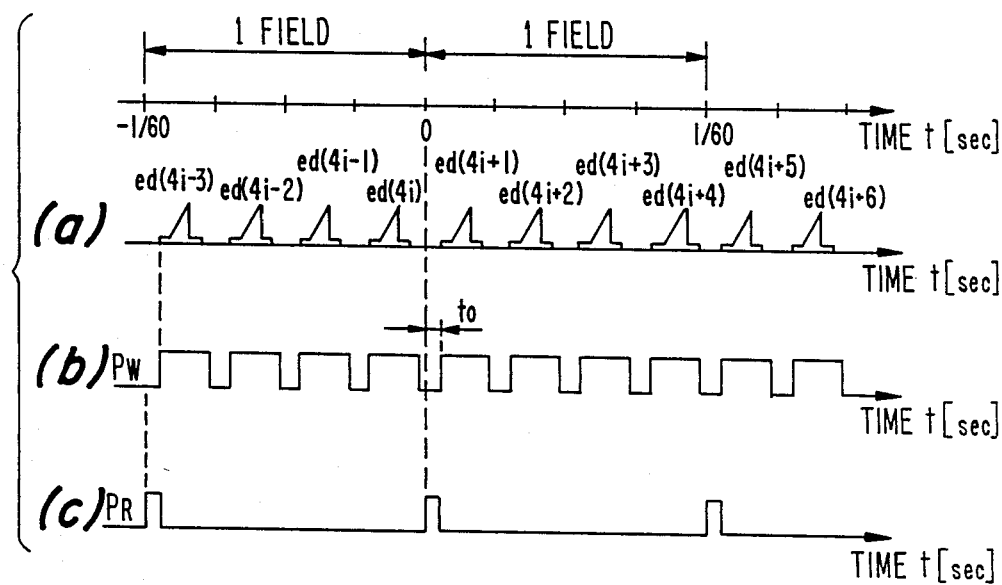

The operation in this period will be described in more details referring to FIG. 8. In case of this embodiment, the CCD 4 is scanned four times in one field period of normal drive by 4f drive, and video signals ed(i) as shown in FIG. 8 (a) are output from the A/D converter 7 every scanning FIG. 8 (b) shows a write pulse $P_w$ which gives write timing for respective field memories 27 thru 30. When the write pulse $P_w$ reaches H level, respective field memories 27 thru 30 transfer digital video signals stored in themselves to the memory at the next stage, and rewrite their own memory contents to video signals corresponding to the outputs of the A/D converter 7 which are newly output or the pictures stored in the field memories at the previous stage. For example, it is assumed that, when the time t=0 in FIG. 8, video signals ed(4−3), ed(4i −2), ed(4i −1) and ed(4i) corresponding to the pictures one thru four fields before at the time of 4f drive are stored successively in field memories 27 thru 30, respectively. Next, when the write pulse $P_w$ changes to H level at the time t=tc·, the storage contents of field memories 27 thru 30 are rewritten successively to ed(4i −2), ed(4i −1), ed(4i) and ed(4i +1). Thereafter, this operation is repeated whenever the write pulse reaches H level.

FIG. 8 (c) shows a read pulse $P_R$ prescribing the timing to read the contents of the field memories and giving them to the adder 10. When this read pulse $P_R$ is applied, the field memories 27 thru 30 read their own storage contents and input them to the adder 10, and the adder 10 executes adding operation of video signals (at t=0, ed(4i −3), ed(4i −2), ed(4i −1) and ed(4i)) corresponding to four scanning time worth of pictures stored successively in respective field memories 26 thru 29.

Figure 9:
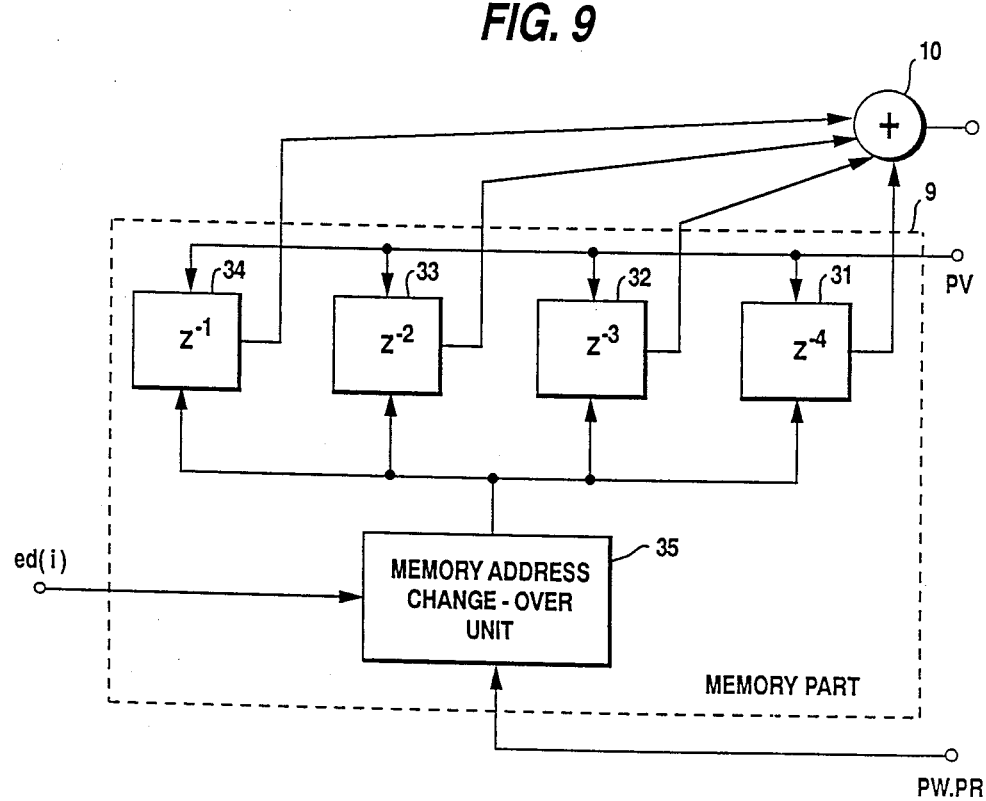
FIG. 9 is a block diagram showing a second embodiment of the memory part.

A second embodiment of a memory part will be described referring to FIG. 9. The memory part 9 is composed of four pieces of field memories 31, 32, 33 and 34 and a memory address change-over unit 35. When the digital control part 17 shown in FIG. 1 inputs a vertical synchronizing pulse $P_v$ corresponding to the vertical synchronizing timing at the time of normal drive to respective field memories 31 thru 34, storage contents of respective field memories 31 thru 34 are all reset. Then, digital video signals ed(4i −3), ed(4i −2), ed(4i −1) and ed(4i) which are outputted from the A/D converter 7 by 4f drive are inputted successively to the memory address change-over unit 35, and writing is executed receiving the write pulse $P_W$ which is outputted from the digital control part 17 at the memory address change-over unit 35 along with designation of memories at respective field memories 31 thru 34. Next, when the write pulse $P_R$ is applied to the memory address change-over unit 35 from the digital control part 17, the field memories 31 thru 34 read the storage contents thereof and input them to the adder 10.

In the present embodiment, it is required for the four pieces of field memories to write only once during the N field at the time of 4f drive, and it is not required to transfer storage contents in the past to the next stage, thus making the composition simple.

Besides, as a third and a fourth embodiments of the memory part, such a composition that is provided with three pieces of field memories that store and hold once three video signals corresponding to pictures that are output from the A/D converter at every synchronizing frequency at the time of 4f drive is also possible in place of four pieces of field memories employed in the first and second embodiments of the memory part. In this case, the adder 10 is formed so that three video signals stored in respective field memories and a video signal corresponding to the fourth picture obtained by latest scanning of the CCD are added. In order to fit such purpose, it is arranged to read video signals from three pieces of field memories in synchronization with the time when the adder 10 reads the video signal corresponding to the fourth picture, and to perform addition of video signals corresponding to these four pictures.

Besides, in the first and second embodiments of the memory part, the composition including a frame memory which stores video signals corresponding to one frame worth of pictures at the time of 4f drive in place of field memories that store and hold digitally video signals corresponding one field worth of pictures at the time of 4f drive is also possible for the memory.

What is claimed is:

1. A video camera comprising:
   at least one image pickup device which receives optical signals from an object through a camera lens;
   an image pickup element drive part which drives said image pickup device at modified synchronizing frequencies obtained by multiplying a horizontal synchronizing frequency and a vertical synchronizing frequency prescribed in a broadcasting system by a specific integer value N, respectively, and has said device perform storage and read-out of said optical signals;
   a stop control part for controlling a stop mechanism installed in said camera lens, based on video signals obtained by driving of the image pickup device executed at said modified synchronizing frequencies so that the video signals are not saturated;
   an analog-digital conversion part which performs analog-digital conversion of the video signals outputted from said image pickup device and outputs digital video signals corresponding to N pieces of pictures in the vertical synchronizing period prescribed in the broadcasting system;
   an arithmetic processing part which executes an arithmetic processing on digital video signals corresponding to said N pieces of pictures and outputs them in synchronization with each position of said N pieces of pictures; and
   a time base restorer which multiplies the modified horizontal synchronizing frequency and vertical synchronizing frequency of the digital video signals computed at said arithmetic processing part by 1/N, respectively, thus restoring to the synchronizing frequencies prescribed in the broadcasting system.

2. A video camera according to claim 1, wherein the arithmetic processing part comprises adding means that adds the digital video signals corresponding to said N pieces of pictures successively at every picture location in synchronization with each position of said N pieces of pictures, and non-linear arithmetic means that outputs the amplitudes of these added digital video signals based on a non-linear relation to compress the maximum amplitude down to a predetermined value.

3. A video camera according to claim 2, wherein the non-linear arithmetic means compresses the amplitude over a certain value based on a predetermined relational expression for luminance signal components among the digital video signals corresponding to said added N pieces of pictures, but do not execute non-linear processing for chrominance signal components.

4. A video camera according to claim 1, wherein the arithmetic processing part comprises means for adding digital video signals corresponding to said N pieces of pictures successively at every picture position in synchronization with said respective N pieces of picture positions, and means for multiplying the result of addition by a predetermined factor.

5. A video camera according to claim 1, wherein the arithmetic processing part includes means for adding digital video signals corresponding to said N pieces of pictures successively at every picture position in synchronization with said N pieces of picture positions, respectively.

6. A video camera according to claim 5, wherein the stop control part comprises detecting means for detecting a digital video signal level which is outputted by the arithmetic processing part or generated inside the arithmetic processing part, and control means for controlling a stop mechanism installed in the camera lens so that digital video signal levels in every field period after modification of the synchronizing frequencies reach predetermined values, respectively.

7. A video camera according to claim 6, wherein the detecting means is a video amplitude computing element for computing at least one value among the maximum value, the minimum value and the average value of amplitude values of digital video signals which are outputted from the arithmetic processing part or generated inside the arithmetic processing part, and the control means is a stop value computing element which controls the stop value of the stop mechanism installed in the camera lens by using the output value of said video amplitude computing element.

8. A video camera according to claim 7, wherein the stop value computing element compares a reference value provided in itself with the output value of said video amplitude computing element and adjusts the stop value of said stop mechanism so that both values are in accord with each other.

9. A video camera according to claim 7, wherein the video amplitude computing element computes at least one value among the maximum value, the minimum value and the average value of amplitude values of digital video signals that are added for every picture by said arithmetic processing part.

10. A video camera according to claim 1, wherein the stop control part comprises detecting means for detecting digital video signal levels that are outputted by the arithmetic processing part or generated inside the arithmetic processing part, and control means for controlling a stop mechanism installed in the camera lens so that digital video signal levels during respective field periods after modification of the synchronizing frequencies reach predetermined values, respectively.

11. A video camera according to claim 10, wherein the detecting means is a video amplitude computing element for computing at least one value among the maximum value, the minimum value and the average value of amplitude values of digital video signals that are outputted by the arithmetic processing part or generated inside the arithmetic processing part, and the control means is a stop value computing element for controlling the stop value of the stop mechanism installed in the camera lens by using the output value of said video amplitude computing element.

12. A video camera according to claim 11, wherein the stop value computing element compares a reference value provided in itself with the output value of said video amplitude computing element and adjusts the stop value of said stop mechanism so that both values are in accord with each other.

13. A video camera according to claim 11, wherein the video amplitude computing element computes at least one value among the maximum value, the minimum value and the average value of amplitude values of digital video signals that are added for every picture in said arithmetic processing part.

14. A video camera according to claim 1, wherein the arithmetic processing part comprises a memory part which stores and holds once digital video signals corresponding to N pieces of said pictures after modification of the synchronizing frequencies, and means for executing an arithmetic processing on the digital video signals corresponding to N pieces of pictures stored, respectively, in synchronization with every picture position.

15. A video camera according to claim 14, wherein the memory part comprises a plurality of memories in cascade connection, and each memory transfers a digital video signal corresponding to each picture stored in itself to a memory at the next stage in every timing of the vertical synchronizing frequency after said modification and rewrites its own storage content to a digital video signal corresponding to a picture stored in a memory at the previous stage.

16. A video camera according to claim 14, wherein the memory part comprises a plurality of memories, and each memory is formed in such a manner that the content thereof is reset simultaneously in every timing of the vertical synchronizing frequency prescribed in the broadcasting system and digital video signals that are input to itself at every scanning of the image pickup device executed thereafter are written successively in specific memories, respectively.

17. A video camera according to claim 1, wherein the arithmetic processing part comprises a memory part which stores and holds once digital video signals corresponding to $N-1$ pieces of said pictures after modification of the synchronizing frequencies, and means for executing an arithmetic processing on digital video signals corresponding to said stored $N-1$ pieces of digital video signals and the Nth picture which is outputted newly from the image pickup device and applied with A/D conversion in synchronization with each picture position, respectively.

18. A video camera according to claim 17, wherein the memory part comprises a plurality of memories in cascade connection, and each memory transfers digital video signals corresponding to each picture stored in itself to a memory at the next stage and rewrites its own storage content to digital video signals corresponding to pictures stored in the memory at the previous stage in every timing of the vertical synchronizing frequencies after said modification.

19. A video camera according to claim 17, wherein the memory parts comprises a plurality of memories, and each memory is formed in such a manner that the content thereof is reset simultaneously in every timing of the vertical synchronizing frequency prescribed in the broadcasting system, and digital video signals that are inputted to itself in every scanning of the image pickup device executed thereafter are written successively in specific memories, respectively.

* * * * *